Figure 1:
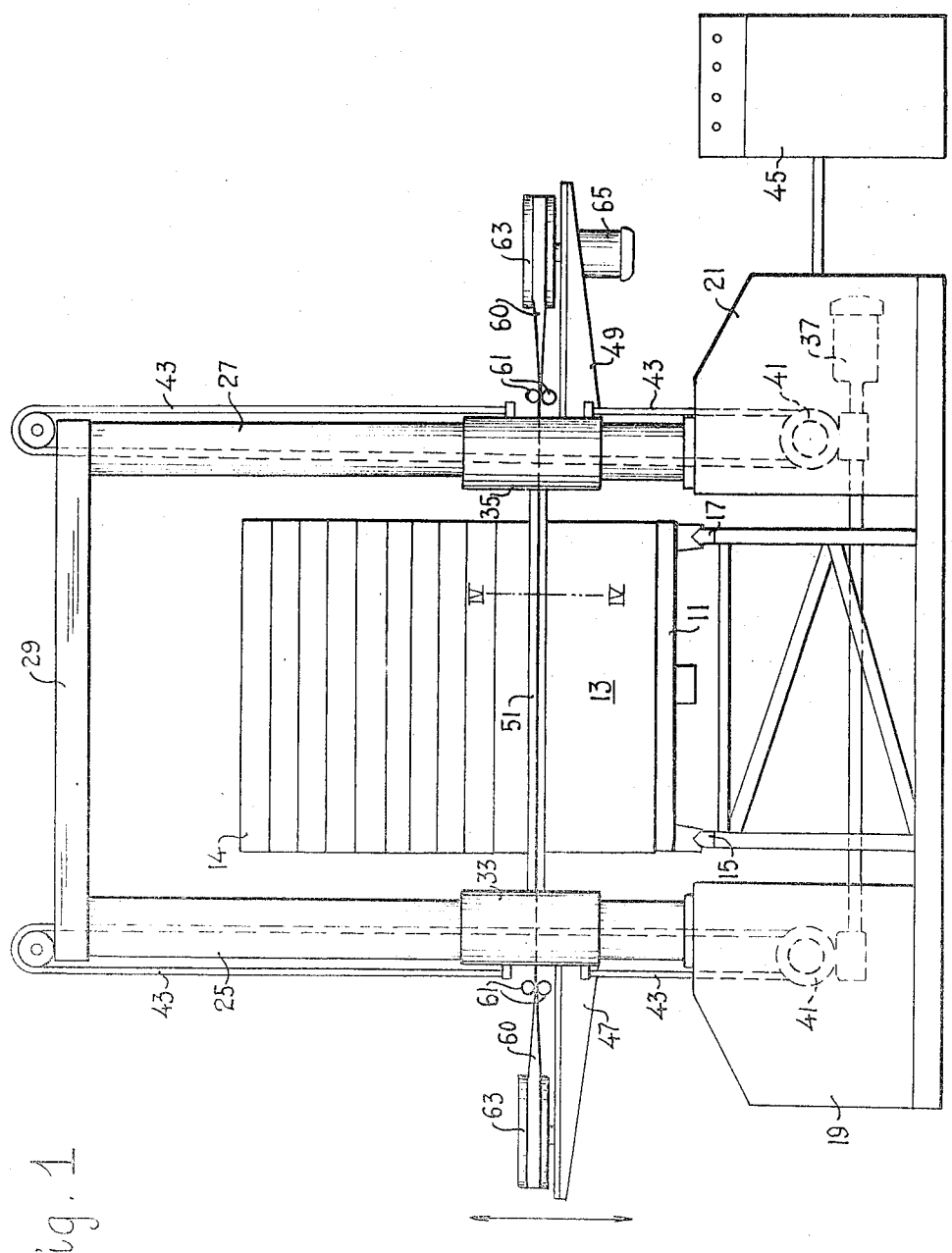

United States Patent [19]
Wirstrom

[11] 3,850,061
[45] Nov. 26, 1974

[54] CUTTING APPARATUS
[76] Inventor: Roland T. Wirstrom, Barrstigen 6, 702 21 Orebro, Sweden
[22] Filed: Sept. 20, 1973
[21] Appl. No.: 399,343

[30] Foreign Application Priority Data
Sept. 20, 1972 Sweden.............................. 12110/72

[52] U.S. Cl...................... 83/4, 83/435.1, 83/578, 83/813, 83/820, 83/707
[51] Int. Cl........................ B29c 17/10, B29d 7/18
[58] Field of Search......... 83/4, 707, 813, 803, 820, 83/433, 435.1, 578, 731

[56] References Cited
UNITED STATES PATENTS
| | | | |
|---|---|---|---|
| 1,383,133 | 6/1921 | Lucke....................................... | 83/4 |
| 3,263,537 | 8/1966 | Rehman et al........................... | 83/4 |
| 3,298,263 | 1/1967 | Bigsby, Jr. et al. ...................... | 83/4 |
| 3,518,909 | 7/1970 | Blue........................................ | 83/820 |
| 3,736,820 | 6/1973 | Jung........................................ | 83/4 |

Primary Examiner—J. M. Meister
Attorney, Agent, or Firm—Cushman, Darby & Cushman

[57] ABSTRACT

A machine is described by means of which a block of plastics material is cut in sheets forming a pile of sheets resting upon the remaining part of the block. A table carries the block past a band knife running in slits in a transverse supporting beam which is vertically adjustable. The band knife which forms an endless loop, runs in a slit along one edge of the beam, is twisted and returned through a slit in the other edge of the beam. The band knife cuts the block during each passage, back or forth, of the table.

14 Claims, 4 Drawing Figures

CUTTING APPARATUS

The present invention relates to an apparatus for cutting a block of plastics material into sheets and forming a pile of such sheets.

In known apparatus a band knife is provided which only cuts through a block of material when the table on which the block is mounted is moved in one direction. When the table is moved in an opposed direction after the band knife has made a cut through the block, the band knife and a stationary guide therefore, must be brought back through the block along the cut which has just been made. This involves the risk of disarranging the pile of cut sheets located thereabove. This is more particularly true if several blocks are located on a single table and are cut in succession. A further drawback is that no cut is effected by the apparatus during the return movement of the table.

The object of the invention is to improve upon the above-mentioned type of apparatus and to elmininate its disadvantages. According to the present invention, there is therefore provided an apparatus for cutting a block of plastics material into sheets and for forming a pile of such sheets comprising a reciprocating table adapted to support and convey at least one block of plastics material, cutting means having two opposed cutting edges, which cutting edges are disposed in substantially the same horizontal plane and means for vertically adjusting the cutting means such that, in use, the at least one block of plastics material is carried, during movement of the table in one direction, into the region of and beyond the cutter means such that the block is cut by the first cutting edge and, during the reverse movement of the table, the block of plastics material is moved back into the region of and beyond the cutting means such that the block is cut by the second cutting edge, the cutting means being vertically adjusted during reversal of the direction of travel of the table.

Preferably, the cuting means is driven such that the two cutting edges move in opposite directions to one another, both being driven in a direction transverse to the direction of travel of the table.

Advantageously, the cutting means comprises one band knife loop, both said cutting edge being disposed on this loop. By cutting the block alternately from opposite sides, the cut sheets are pulled first to one side during one movement of the table and are pulled back to an upright position during the reverse movement of the table. Thus, the stepped shape, inconvenient in several respects, which is formed when the band knife cuts only during travel in one direction, is obviated.

Figure 2:
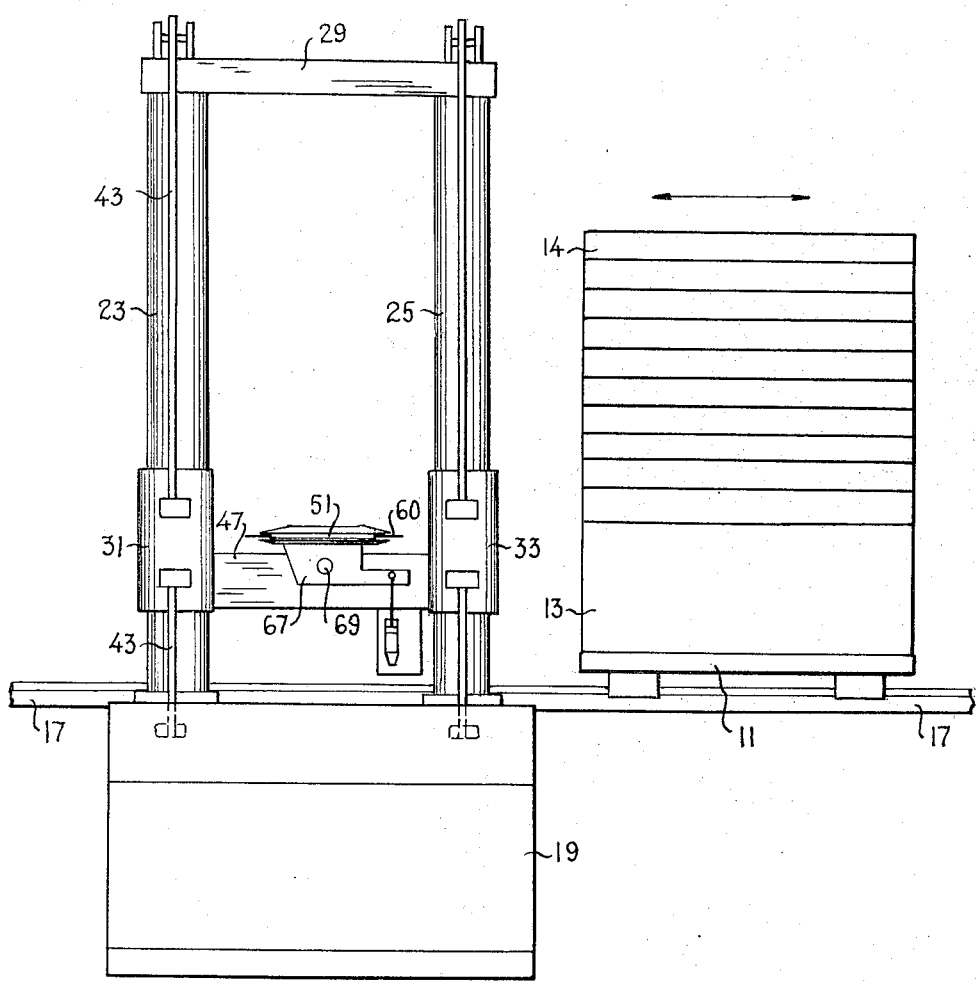
Figure 3:
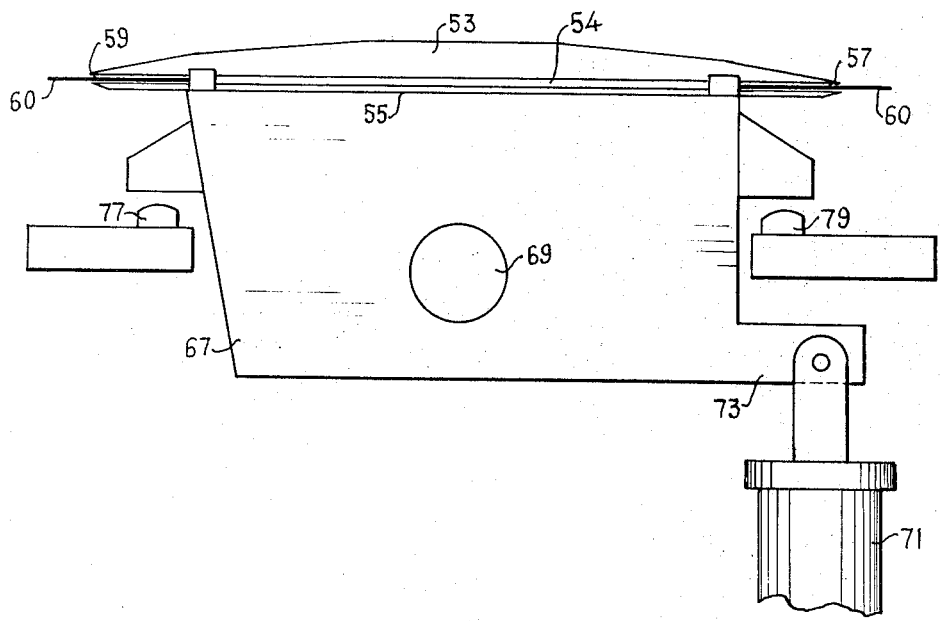
Figure 4:
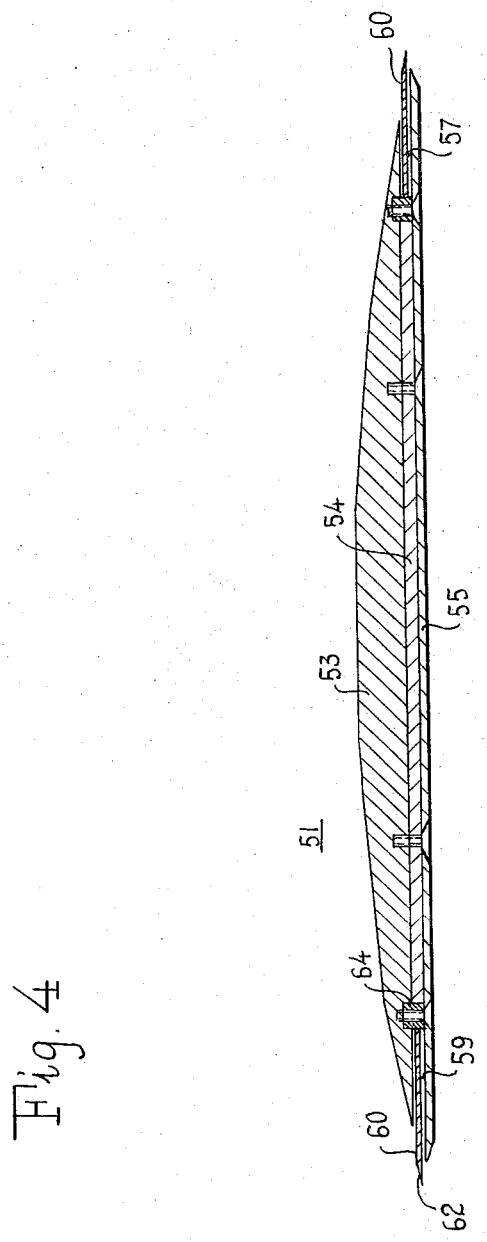

The invention will be further described, purely by way of example, with reference to the accompanying drawings, in which:

FIG. 1 is a front elevational view of an apparatus in accordance with the present invention, FIG. 2 is an end elevational view of the apparatus of FIG. 1, FIG. 3 shows, on an enlarged scale, a portion of the apparatus shown in FIG. 2, and FIG. 4 is a vertical cross-sectional view taken along the line IV — IV in FIG. 1 and shown on an enlarged scale.

In FIGS. 1 and 2, there is shown a sliding table 11 which has supported thereon a block 13 made of, for example, foamed plastics material, which block is to be cut into thin sheets 14. After cutting, the sheets 14 remain upon the block, so that a pile of sheets is formed. The table is displaceably located upon a track formed of two parallel horizontal rails 15, 17, which are themselves supported on a framework or a similar stationary bed. The table is reciprocatable on the rails 15, 17, by driving means (not shown). The track extends between two base blocks 19, 21, which are each rigidly mounted on a firm foundation. Four columns, two on each block 19 and 21, are mounted on these blocks at the corners of a rectangle and extend upwardly therefrom. A substantially rectangular upper frame 29 interconnects the upper ends of the columns 23, 25, 27, (the fourth column being obscured in the views shown). Sleeves 31, 33, 35, are displaceable mounted, one upon each of said columns, and are adjustable by means of a common motor 37 through the intermediary of gears 41 and chain transmissions 43. From a control stand 45, the motor 37 and the driving means for the table 11 are controlled in such a manner that each time the direction of motion of the table is reversed, the sleeves are all moved downwardly through a distance which corresponds to the desired thickness of the plastic sheets 14 to be cut. Holders 47 and 49, respectively, are inserted between the two sleeves on the same side of the track. These two holders each support one end of a beam 51 which extends in a substantially horizontal plane, transversely across the gap between the two blocks 19 and 21. The beam comprises an upper plate 53, an intermediate plate 54 and a lower plate 55 which are screwed together. The intermediate plate 54 is of a smaller width than the two other plates, slits 57 and 59 thus being formed along the opposite longitudinal edges of the beam. These slits form guides for a band knife 60, which knife effects the cutting of the plastics material block. The band knife 60 is in the form of a closed loop. In each holder, this loop runs over support rollers 61 and a reversing roller 63. One of the reversing roller 63 is driven by a motor 65. From one of the support rollers 61, the axes of which are in a horizontal plane, the band knife runs onto the reversing roller 63, the axis of which is in a vertical plane. The band is thus twisted through substantially 90° about its longitudinal axis between the support roller 61 and the reversing roller 63. The band is then reversed through substantially 180° in passing around the reversing roller 63. Between the reversing roller 63 and the other support roller 61, the band is again twisted through substantially 90° about its longitudinal axis, in the opposite direction to that of the first twist. This means that the same side of the band always faces upwardly in the region of the block to be cut, and the same edge, that is to say, the cutting edge, of the blade is directly outwardly on both sides of the beam. The greater part of the width of the band knife runs within the slit 57 or 59 and only a small part close to the sharpened edge 62 thereof extends beyond the longitudinal edge of the beam. The unsharpened band edge slides against a number of hard metal studs 64 at the bottom of the slits 57, 59.

In section the beam tapers and is pointed in both directions in order to be able to follow the cutting edge of the knife through the plastic block with the least possible disturbance to the same and the overlying pile of cut sheets. The beam forms a guide which extends over the entire width of the operative portion of the machine and keeps the cutting portion of the band knife straight and true at the predetermined level. Along one edge of the beam, the band travels in one direction, for example, from left to right, as shown in FIG. 1, and along the opposite edge of the beam, the band runs in the opposite direction, that is to say from right to left as shown in FIG. 1. The displacement of the pile of cut plastic sheets that may be caused by friction against the band knife, takes place alternately against opposite sides of the pile. It is therefore equalized, so that the pile of cut sheets stays upright.

The beam can be rotated about its axis in order to adjust the angle of the cutting edge of the band knife. At each end thereof, adjacent the vertical inner face of the holder 47 or 49, respectively, the beam carries a plate 67 which is pivotally mounted on a horizontal pin 69 attached to the holder. By means of a hydraulic cylinder 71, the piston of which is pivotally connected to a projecting portion 73 of the plate 67, the latter can be adjusted between the end positions determined by two fixed, or adjustable, stops 77, 79. The cylinder is operated simultaneously with the reciprocation of the table and therefore the cutting edge of the band knife will be adjusted to provide a cutting angle which is the same independently of the direction in which the plastic block is moved.

What I claim is:

1. Apparatus for cutting a block of plastic material into sheets and for forming a pile of such sheets, said apparatus comprising:
   a. a reciprocating table adapted to support and convey at least one block of plastic material in a first direction and in a direction reverse to said first direction,
   b. cutting means having first and second opposed cutting edges, which cutting edges are disposed in substantially the same horizontal plane in the normal position thereof,
   c. means for vertically adjusting said cutting means at each reversal of table movement direction so that at least one block of plastic material carried by said table is carried during the movement of said table in said first direction into the region of and beyond said cutting means such that the block is cut by said first cutting edge, and after cutting of the block by said first cutting edge the block is carried during table movement in the reverse direction into the region of and beyond the cutting means such that the block is cut by said second cutting edge,
   d. means for guiding said cutting means comprising a vertically adjustable beam having means defining slits for receiving said cutting means, and
   e. means for providing pivotal movement of said beam in either direction from said normal position about a horizontal axis such that said cutting edges can be rotated to a desired angle relative to the direction of motion of said table.

2. Apparatus as recited in claim 1 further comprising means for automatically pivoting said beam about said horizontal axis in response to reversal of the direction of travel of said table.

3. Apparatus as recited in claim 1 wherein said means providing pivotal movement include a plate at each opposed end of said beam mounted for rotation about a pivotal axis.

4. Apparatus as recited in claim 3 wherein one of said plates has an extension thereof adapted to be acted upon by a hydraulic cylinder for pivoting said plate and beam about said horizontal axis.

5. Apparatus as recited in claim 4 further comprising means for automatically pivoting said beam about said horizontal axis in response to reversal of the direction of travel of said table, said means including a hydraulic cylinder operatively attached to said plate extension.

6. Apparatus as recited in claim 1 further comprising means for limiting the angle of rotation of said beam about said horizontal axis in either direction.

7. Apparatus for cutting a block of plastic material into sheets and for forming a pile of such sheets, said apparatus comprising
   a. a reciprocating table adapted to support and convey at least one block of plastic material in a first direction and in a direction reverse to said first direction,
   b. cutting means having first and second opposed cutting edges, which cutting edges are disposed in substantially the same horizontal plane in the normal position thereof,
   c. means for vertically adjusting said cutting means at each reversal of table movement direction so that at least one block of plastic material carried by said table is carried during the movement of said table in said first direction into the region of and beyond said cutting means such that the block is cut by said first cutting edge, and after cutting of the block by said first cutting edge the block is carried during table movement in the reverse direction into the region of and beyond the cutting means such that the block is cut by said second cutting edge,
   d. means for driving said cutting means so that said first and second cutting edges move in directions opposite to one another, and for driving both of them in a direction transverse to the direction of travel of said table.

8. Apparatus as recited in claim 7 wherein said cutting means comprises a single band loop knife, both of said cutting edges being disposed on said loop, and wherein said apparatus further comprises means for twisting said loop about its longitudinal axis beyond the region of said table so that said cutting edges face in substantially opposed directions.

9. Apparatus as recited in claim 8 wherein said twisting means comprise a plurality of support rollers and a plurality of reversing rollers, each of said support rollers mounted for rotation about a substantially vertical axis and each of said reversing rollers mounted for rotation about a substantially horizontal axis.

10. Apparatus as recited in claim 7 further comprising means for guiding said cutting means comprising a vertically adjustable beam having means defining slits for receiving said cutting means and
    means for providing pivotal movement of said beam in either direction from said normal position about a horizontal axis such that said cutting edges can be rotated to a desired angle relative to the direction of motion of said table.

11. Apparatus as recited in claim 10 further comprising means for automatically pivoting said beam about said horizontal axis in response to reversal of the direction of travel of said table.

12. Apparatus as recited in claim 10 wherein said means providing pivotal movement include a plate at each opposed end of said beam mounted for rotation about a pivotal axis.

13. Apparatus as recited in claim 12 wherein one of said plates has an extension thereof adapted to be acted upon by a hydraulic cylinder for pivoting said plate and beam about said horizontal axis.

14. Apparatus as recited in claim 13 further comprising means for automatically pivoting said beam about said horizontal axis in response to reversal of the direction of travel of said table, said means including a hydraulic cylinder operatively attached to said plate extension.

* * * * *